Patented Mar. 6, 1934

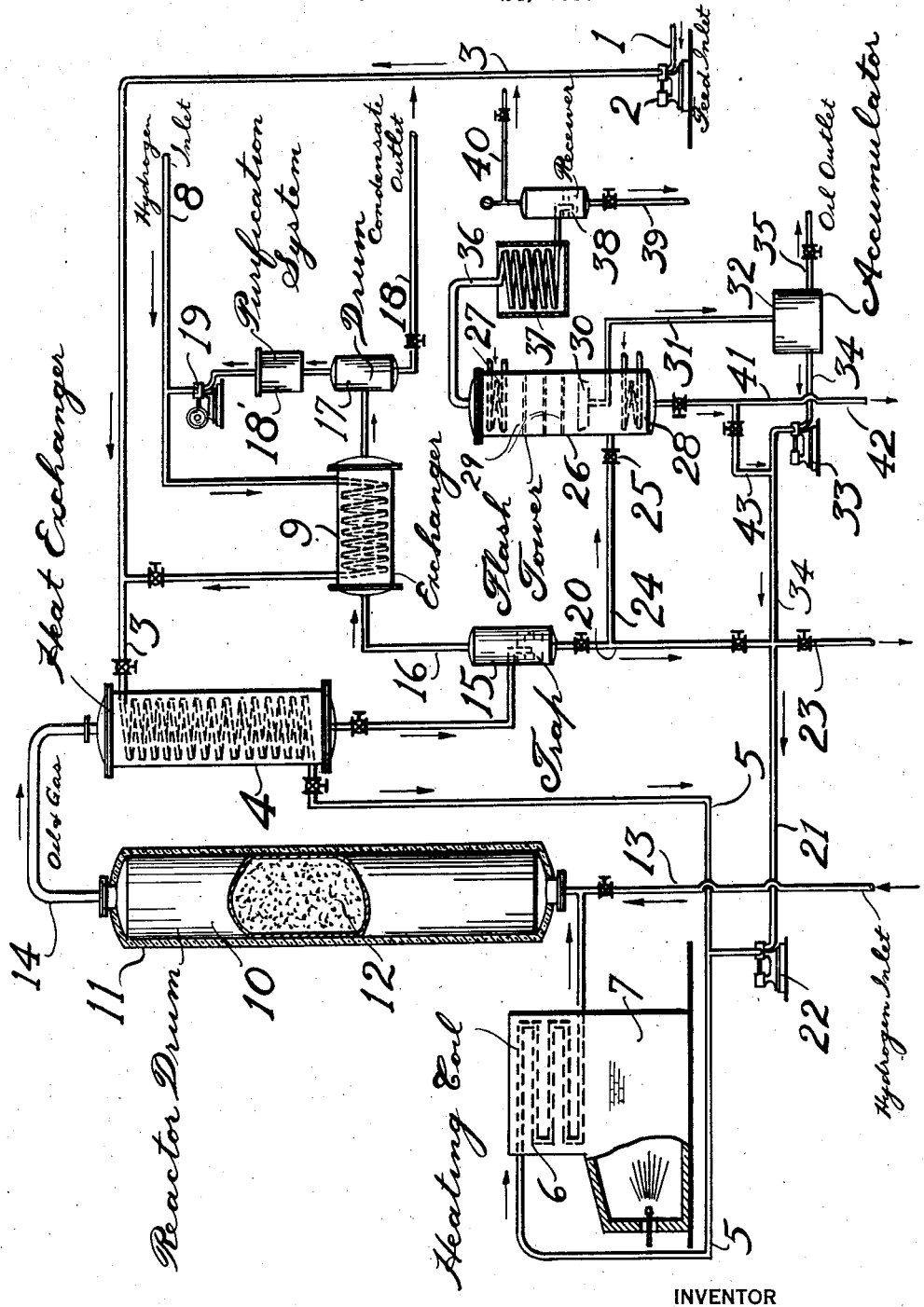

1,949,632

UNITED STATES PATENT OFFICE 1,949,632

PROCESS FOR THE PRODUCTION OF LOW BOILING FROM HIGHER BOILING HYDROCARBONS BY THE ACTION OF HYDROGEN AT ELEVATED TEMPERATURES

Robert P. Russell, Baton Rouge, La., assignor to Standard-I. G. Company

Application March 24, 1930, Serial No. 438,405

6 Claims. (Cl. 196—53)

The present invention relates to an improved process for obtaining low boiling hydrocarbons from heavier hydrocarbons by the action of hydrogen at elevated temperatures. The invention will be more fully understood from the following description and the drawing which illustrates one form of apparatus which may be used in carrying out the present process.

The drawing is a semi-diagrammatic view in sectional elevation of an apparatus constructed according to the invention and indicates the flow of various materials through the apparatus.

Referring to the drawing reference numeral 1 indicates a feed line by which oil is withdrawn from any convenient source by a pump 2 and forced by line 3 through a heat exchanger 4 and by line 5 into a heated coil 6 arranged in a setting 7. Hydrogen under high pressure may be forced into the system through a line 8 and through an exchanger 9 into line 3 joining the stream of hydrocarbon oil preferably prior to the flow through the exchanger 4. The heated mixture of oil and hydrogen is forced into a reactor drum 10 which is preferably protected from loss of heat by an insulating cover 11 and is packed with suitable catalytic material 12, the nature of which will be indicated below. Additional hydrogen may be forced directly into the drum 10 by a line 13 which may be connected by lines, not shown, to the source of hydrogen supply. The oil and gas are removed from the drum 10 under high pressure by line 14 and are passed through the exchanger 4 and into a trap 15. Gas and vaporous components are removed from trap 15 by line 16 connecting with the exchanger 9 and thence to a second condensation drum 17 from which condensate is removed by line 18 to storage, not shown. The gaseous product is removed to a purification system 18 which may comprise an oil scrubbing system operated at high pressure to remove hydrogen sulfide and hydrocarbon constituents and the purified gas comprising substantially pure hydrogen is recompressed by a booster pump 19 and returned to the hydrogen feed line 8, as indicated above.

Oil is withdrawn from trap 15 by line 20 and may be fed from line 20 to a line 21 and forced therethrough by a pump 22 into the line 5 which returns the product to the coil 6 and drum 10. Part of the heavy oil may be removed from the system by a line 23 to storage, not shown. If desired instead of returning the oil from trap 15 directly to line 21 it may be withdrawn by a line 24, which is fitted with a reduction valve 25 and discharged at reduced pressure into a flash tower 26. This tower may be constructed in any suitable manner with a reflux coil 27 at the top, heating coil 28 at the base and fractionating plates 29 arranged between the two coils. A pan 30 may also be placed under the coils, but above the point at which line 25 discharges into the tower so as to collect a clean condensate. This may be removed by a line 31 to an accumulator tank 32 and may be forced therefrom by a pump 33 through a line 34 and into line 21 as indicated before. Part of the oil may be withdrawn from accumulator 32 by a line 35 and removed to storage not shown.

Light products are removed from the top of flash tower 26 by a vapor line 36 which connects with the condenser 37 and receiver 38 from which liquid is withdrawn to a light oil storage by a line 39 and gas is conducted by a line 40 either to mix with refinery fuel or be recompressed, purified and added to the hydrogen line 8 by connections, not shown. The heavier residual product unvaporized in tower 26 is withdrawn by a line 41 and may be taken from the system by line 42. A part or whole of this product may be added to line 34 by a connection 43.

In the operation of this improved process oil which may be a crude oil, reduced crude, tarry or asphaltic residue and especially such oils as Mexican, Venezuelan crudes which are not ordinarily used for lubricating oil production, and hydrogen are preferably heated to an elevated temperature, for example; to a temperature above about 850° F. by rapid passage through a heated coil at a high rate sufficient to prevent substantial formation of coke. The heated mixture then passes under high pressure through a reaction drum packed with a suitable catalyst, immune to sulphur poisoning, which may comprise the oxides or sulfides of such metals as chromium, molybdenum or tungsten, their mixtures with each other or with other compounds such as zinc oxide, magnesia, lime or alumina. These catalysts may be used alone or admixed with bodies such as kaolin or other aluminous, or siliceous materials or spread on the surface of inert materials such as fire brick, porcelain, pottery fragments and the like. It will be understood, these catalysts do not lose their activity in presence of even large quantities of sulphurous materials hence they may be suitably classified as sulfactive catalysts. The drum is preferably maintained at a temperature in excess of 825° F. or 830° F. throughout and it has been found that such temperature may readily be maintained without serious drop from the outlet of the coil merely by preventing excessive radiation loss of heat, either by suitable insulation or by other equivalent means. The drum is ordinarily maintained at a pressure above 20 atmospheres and preferably in excess of 100 or 200 atmospheres and may be 1000 atmospheres or more. In its flow through the catalytic mass in contact with hydrogen a substantial part of the oil in a continuous liquid phase is converted into lower boiling products suitable in boiling range for motor fuel, that is to say, boiling below about 400° F. While it is possible to make a separation of liquid and vaporous products in the reaction chamber 10 it is preferred to withdraw the entire mass from the drum and separate at a somewhat lower temperature which may be produced either by positive cooling or by radiation loss. It is preferred to positively cool so as to be able to accurately maintain the temperature in the separation drums 15 which may be sufficiently high to allow all or a substantial part of the lower boiling products to be removed in the vaporous form with the gas and be condensed by further cooling. The condensate from drum 15 may either be recirculated directly to the heating coil and to the drum by lines 20, 21 and 5 and in such cases it is desirable to remove components boiling below about 400° F. with the gas as noted above. In an alternate mode of operation drum 15 is held at a lower temperature at which the major quantity of the products boiling below 400° F. are condensed with heavier portions. In such a case it is preferable to close the valve shown in line 20 and to discharge the product with reduction of pressure at valve 25 into a flash tower or equivalent device indicated in the drawing by reference numeral 26. By this means the oil may be fractionated into three or more cuts comprising light distillate suitable for motor fuel and a very heavy oil comprising the last 5, 10 or 15 percent of the product and also a middle oil distillate which may be returned to the system by lines 31, 34, 21 and 5. The whole or a part of the heavy oil may be withdrawn from the system by means of lines 41 and 42 and may be used as a heavy fuel oil or the like being superior to present grades of cracked residue. If desired, the middle oil and the heavy oil may be combined and returned to the drum as before, or they may be combined in any desired proportion. As will be understood it is intended that the major quantity of the oil in the reactor is in liquid phase so that if relatively low boiling feed stocks are used or a relatively high proportion of middle oil is recirculated, higher pressure should be maintained. The middle oil may be used alone as a gas oil and is superior to the ordinary oil now generally sold for gas carburetion.

The drum 15 is ordinarily maintained at a temperature between about 300 and 650° F. depending on the pressure in the system and on the mode of operation, for example; if it is desired to carry the major quantity of gasoline overhead with the gas, the temperature should be maintained at the upper end of the range given, particularly at high pressures, but where it is desired to hold the major quantity of the gasoline in liquid phase and to use a separation tower 26 it is preferable to reduce the temperature of the drum to the lower end of the range given above. It is particularly desirable to hold the drum at about 250 to 450° F. and to take the light fractions overhead with the gas and to retain heavier fractions of the gasoline in the liquid phase. Products from separation drums 17 and 38 may thereafter be combined to form a suitable motor fuel.

As an example of the operation of the process topped Crane-Upton crude having a gravity of 23.4° A. P. I. 66% boiling at 700° F. with a sulfur content of 1.21% is fed at a rate of about 1.5 volumes of oil per volume of reactor drum per hour. Coil outlet temperature is about 870° F. while drum is maintained at a temperature of 850° F. The gas rate is about 5000 cubic feet per barrel of oil fed. The catalyst comprises small lumps of a mixture of molybdenum and magnesium oxides. A product comprising 99.08% of the original oil was withdrawn without distillation from the reaction chamber cooled and recovered having a gravity of 31.9 of the following boiling range:

| | |
|---|---|
| % at 374 | 14.2 |
| % at 400 | 18.0 |
| % at 700 | 73.4 |
| % sulphur | .49 |

When fractionated this product contained 18% of a light oil suitable for motor fuel, about 50% of a gas oil having a gravity of 34.2° and the remainder a fuel oil of 19.30 A. P. I. which are non-viscous. The gas oil and the heavy residue may be returned to the drum and under such conditions as will be understood the fresh feed rate is reduced to about .5 per volume of reaction drum per hour, with a gasoline yield of 70 to 80% of the fresh oil fed.

From the above it will be seen that two different types of operation are anticipated, the one is a once-through operation in which in addition to gasoline, gas oil and heavy fuel oil are produced. In this type of operation every product is superior to the corresponding products from the feed oil. For example, the gas oil is much superior as carbureting fluid, less being necessary to produce a given equivalent of the gas and the fuel oil is less viscous and shows less tendency to plug lines and burners. Both products contain much less sulphur.

The other type of operation is one in which a part of either the heavy oil or the gas oil, or indeed a part or the whole of both oils is continuously returned to the drum larger gasoline yields, say 70 to 80%. No carbon is deposited in this operation even when all of the heaviest oil is recirculated, but it is preferable to withdraw part of the heaviest oil, say 5 to 20% in order to eliminate difficultly hydrogenating materials, such as finely divided carbon which may be in a colloidal state. Other equivalent means of eliminating these materials may be used, such as filtration or centrifugal means, colloidal precipitation and settling, for example, with dilute sulfuric acid at elevated temperature, or the like. In this way the feed rate may be considerably increased, although it is, of course, still considerably less than in the first type of operation where the yield of gasoline is 15 to 30%.

While this process is ordinarily intended to operate on residual stocks, which by nature are not applicable to lubricating oil products, it should be understood that other types of heavy oils may be utilized with equally good results.

This invention is not to be limited by any theory of the mechanism of the reactions, nor to any specific example which may have been given for purpose of illustration, but only by the following claims in which it is desired to claim all novelty inherent in this invention.

I claim:
1. An improved process for producing valuable products from heavy reduced crude oils, refinery residues and the like which comprises passing the oil in continuous liquid phase with hydrogen at pressure in excess of 100 atmospheres through a reaction zone packed with lumps of solid catalytic material selected from the class comprising oxides and sulphides of metals of the VI Group of the Periodic System at a temperature of the order of 850 to 870° F., removing total liquid and vaporous products in a single stream without distillation from the reaction zone after the major quantity of the oil is converted into naphtha and heavier non-viscous fractions, cooling the stream of products while under full pressure to a temperature at which only naphtha remains vaporized, separating condensate from vapor, separating the vaporized naphtha from the gas and separating the condensate into middle oil and heavy fuel oil fractions.

2. An improved process for obtaining lower boiling hydrocarbons from heavier petroleum residues by destructive hydrogenation, which comprises forcing the oil in continuous liquid phase and at a uniform rate of flow together with a gas rich in free hydrogen through a reaction chamber packed with a sulphactive hydrogenation catalyst in lump form while at a temperature of the order of 850° to 870° F. and under pressure in excess of 20 atmospheres, withdrawing the products of reaction without distillation from the reaction zone whereby the major quantity of the heavy oil is converted into gasoline and heavier non-viscous fractions of the nature of gas oil.

3. Process according to claim 2 in which the product is cooled and separated into gasoline, heavier middle oil and fuel oil.

4. Process according to claim 2 in which fractions corresponding to gasoline are separated and the portion of the residue is returned to the reaction chamber.

5. Process according to claim 2 in which the product is cooled, separated into gasoline, middle oil and a heavier residue and in which the middle oil is returned to the reaction chamber.

6. An improved process for obtaining valuable products from heavy petroleum residues by destructive hydrogenation, comprising passing the heavy oil in a continuous liquid phase in admixture with hydrogen through a heating zone and a reaction zone packed with sulphactive hydrogenation catalyst in lump form, providing a temperature of the order of 850° to 870° F. and a total pressure in excess of 100 atmospheres for reaction, providing a continuous uniform flow of the order of 1.5 volumes of oil per hour per volume of reaction space, and withdrawing and cooling the products without distillation from the reaction zone.

ROBERT P. RUSSELL.